US010580235B1

(12) United States Patent
Gopalan et al.

(10) Patent No.: US 10,580,235 B1
(45) Date of Patent: Mar. 3, 2020

(54) VISITOR MEETING REGISTRATION AND MANAGEMENT

(71) Applicant: Honeywell International Inc., Morris Plains, NJ (US)

(72) Inventors: Murugan Gopalan, Bangalore (IN); Roshan Lawrence Valder, Bangalore (IN); Magesh Lingan, Bangalore (IN); Tanya Mahajan, Bangalore (IN); Sanjay Roy, Plymouth, MN (US); Himanshu Khurana, Plymouth, MN (US); Mandar Tigga, Bangalore (IN); Manu Taranath, Bangalore (IN); Shouvik Brahma, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/140,209

(22) Filed: Sep. 24, 2018

(51) Int. Cl.
*G07C 9/00* (2006.01)
*H04W 4/80* (2018.01)
*G09B 29/10* (2006.01)
*G06F 3/0481* (2013.01)

(52) U.S. Cl.
CPC ...... *G07C 9/00111* (2013.01); *G06F 3/04812* (2013.01); *G07C 9/00031* (2013.01); *G09B 29/106* (2013.01); *H04W 4/80* (2018.02)

(58) Field of Classification Search
CPC ... G07C 9/00111; G06F 3/04812; H04W 4/80
USPC .......................................................... 340/5.2
See application file for complete search history.

(56) References Cited

U.S. PATENT DOCUMENTS

| 7,600,679 | B2 | 10/2009 | Kshirsagar et al. |
| 7,733,213 | B2 | 6/2010 | Levine |
| 2006/0131388 | A1* | 6/2006 | Brodin .................. B42D 25/00 235/380 |
| 2009/0036148 | A1* | 2/2009 | Yach .................... G06Q 10/109 455/457 |
| 2013/0292467 | A1* | 11/2013 | Avs .................... G07C 9/00031 235/381 |

(Continued)

OTHER PUBLICATIONS

"MyGate", https://mygate.in/, May 4, 2018, 12 pages.

(Continued)

*Primary Examiner* — Vernal U Brown
(74) *Attorney, Agent, or Firm* — Brooks, Cameron & Huebsch, PLLC

(57) ABSTRACT

Visitor meeting registration and management is described herein. One device includes a user interface, memory, and processor to receive, from a user of the mobile device via the user interface, an invitation code associated with an invitation received by the mobile device for a meeting at a facility, display, on the user interface upon receiving the invitation code, a registration screen for the meeting, receive, from the user via the registration screen displayed on the user interface, registration information for the meeting, send the registration information to a computing device associated with the facility, receive, from the computing device, an identification mechanism for the user, provide the identification mechanism for the user to a visitor validation device at an entry point to the facility, and receive, from the computing device upon providing the identification mechanism to the visitor validation device, a digital badge for accessing the facility.

18 Claims, 4 Drawing Sheets

(56) References Cited

U.S. PATENT DOCUMENTS

2015/0054616 A1* 2/2015 Friedman ........... G07C 9/00158
340/5.53
2015/0106150 A1* 4/2015 Soleimani ............... H04L 63/10
705/7.19

OTHER PUBLICATIONS

"Gatekeeper—Complete Apartment Security Management", https://www.apnacomplex.com/gatekeeper, May 4, 2018, 10 pages.
"Gate Sentry—Visitor Management Software", http://www.gatesentry.com/, May 4, 2018, 10 pages.

* cited by examiner

550

440

VISITOR MEETING REGISTRATION AND MANAGEMENT

TECHNICAL FIELD

The present disclosure relates generally to systems, methods, and devices for visitor meeting registration and management.

BACKGROUND

When a visitor (e.g., guest) to a commercial facility, such as, for instance, an office building, arrives at the facility, he or she may be required to register (e.g. check in) with a receptionist and/or security personnel. For example, upon arriving at the facility, the visitor may have to sign in, provide their personal information, and/or review and sign agreements to complete the registration process. The receptionist or security personnel may then contact the visitor's host (e.g., the person whom the visitor has come to meet with) to let the host know their visitor has arrived. The host may then have to come to the facility entrance to greet the visitor and accompany the visitor into the facility.

DETAILED DESCRIPTION

Figure 1:
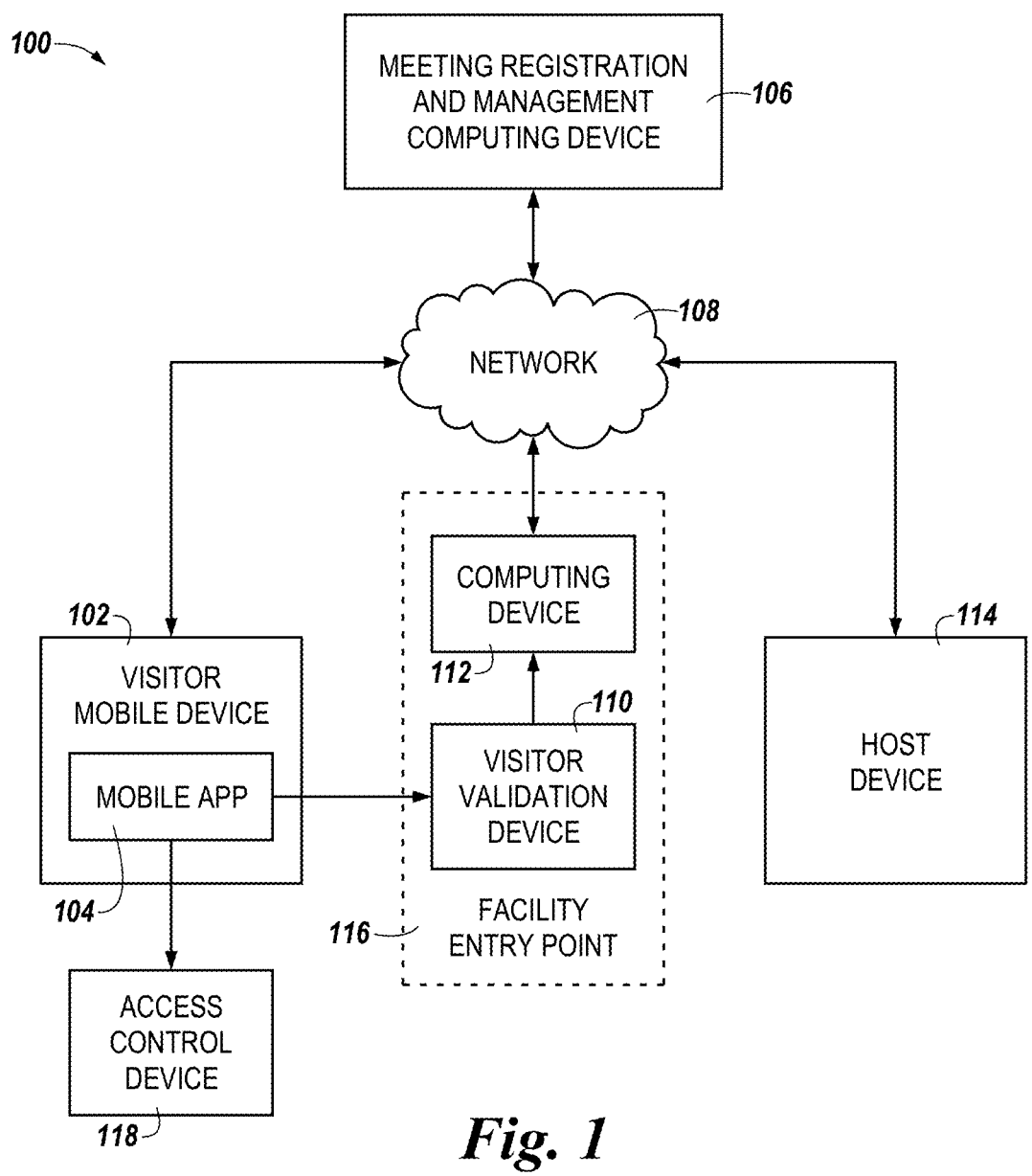
FIG. 1 illustrates an example of a system for visitor meeting registration and management in accordance with an embodiment of the present disclosure.

Systems, methods, and devices for visitor meeting registration and management are described herein. For example, an embodiment includes a user interface, memory, and processor to receive, from a user of the mobile device via the user interface, an invitation code associated with an invitation received by the mobile device for a meeting at a facility, display, on the user interface upon receiving the invitation code, a registration screen for the meeting, receive, from the user via the registration screen displayed on the user interface, registration information for the meeting, send the registration information to a computing device associated with the facility, receive, from the computing device, an identification mechanism for the user, provide the identification mechanism for the user to a visitor validation device at an entry point to the facility, and receive, from the computing device upon providing the identification mechanism to the visitor validation device, a digital badge for accessing the facility.

Previous visitor registration processes, such as, for instance, those in which the visitor is required to register (e.g., sign in) with a receptionist and/or security personnel at the entrance of a facility upon arriving at the facility, can be time consuming and/or inefficient for both the visitor and the visitor's host. For example, previous visitor registration process, which may include requiring the visitor to sign in, provide their personal information, and/or review and sign agreements upon their arrival, can take a significant amount of time for the visitor to complete, resulting in a delay for the visitor. Such a time delay may be especially pronounced during peak visiting hours, when visitors may have to queue up and wait at the facility entrance to complete the registration process. Further, previous visitor registration processes may require the host to wait (e.g., in their office) for the receptionist or security personnel to contact them and inform them of their visitor's arrival, and then travel to the facility entrance to meet their visitor and accompany (e.g. escort) the visitor throughout their visit.

In some instances, the host could speed up such previous visitor registration process by providing information about the visitor to the receptionist or security personnel ahead of time. However, in most cases the host may not have, and/or may not be able to obtain, the needed information.

Further, such previous visitor registration processes may be inadequate for managing the visitor's visit. For example, the visitor may have to rely on the host, or other occupants of the facility, to navigate through the facility. For instance, the host, or other occupants of the facility, may have to guide and/or escort the visitor to the meeting location in the facility, and/or to other locations in the facility (e.g., restrooms, cafeteria, etc.). Further, the receptionist or security personnel may have no way to track the visitor's location in the facility during the visit, determine whether the visitor has left the facility (e.g., because the visitor's meeting has ended), or contact the visitor and/or inform the visitor of what to do in case of an emergency.

In contrast, visitor meeting registration and management processes in accordance with the present disclosure can be less time consuming and/or more efficient for both the visitor and the visitor's host than previous visitor registration processes. For example, visitor meeting registration and management processes in accordance with the present disclosure can allow the visitor to register, provide their personal information, and/or review and sign agreements ahead of time before the meeting (e.g., before arriving at the facility), thereby reducing or eliminating delays upon arrival at the facility. Further, visitor meeting registration and management processes in accordance with the present disclosure can provide automated notifications of the visitor's arrival to the host, thereby eliminating the need the host to wait for the receptionist or security personnel to contact them and inform them of their visitor's arrival, Further, visitor meeting registration and management processes in accordance with the present disclosure can provide better management of the visitor's visit than previous visitor registration processes, which can eliminate the need for the host to travel to the facility entrance to meet their visitor and accompany (e.g., escort) the visitor throughout the visit. For example, visitor meeting registration and management processes in accordance with the present disclosure can allow the visitor to autonomously navigate through the facility, without having to rely on the host, or other occupants of the facility, to guide and/or escort them to the meeting location in the facility or to other locations in the facility (e.g., restrooms, cafeteria, etc.). Further, visitor meeting registration and management processes in accordance with the present disclosure can allow the receptionist or security personnel to track the visitor's location in the facility during the visit, determine whether the visitor has left the facility (e.g., because the visitor's meeting has ended), and contact the visitor and inform the visitor of what to do in case of an emergency.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things, while "a plurality of" something can refer to more than one such things. For example, "a number of devices" can refer to one or more devices, while "a plurality of devices" can refer to more than one device.

FIG. 1 illustrates an example of a system 100 for visitor meeting registration and management in accordance with an embodiment of the present disclosure. As shown in FIG. 1, system 100 can include a mobile device 102, a meeting registration and management computing device 106, a visitor validation device 110, a computing device 112, and a host device 114.

Visitor mobile device 104 can be, for example, the mobile device of a visitor (e.g., guest) to a facility who is being invited to a meeting at the facility by a host, as will be further described herein. The mobile device 104 can be, for example, a smart phone or tablet, among other types of mobile devices, and can include a mobile app 104, as illustrated in FIG. 1. As used herein, a mobile app may include and/or refer to computer readable and/or executable instructions (e.g., a computer program) designed to run on a mobile device such as a smart phone or tablet. For instance, mobile app 104 may be run on mobile device 102 to perform visitor meeting registration and management in accordance with the present disclosure. Further, mobile device 102 can include a memory, a processor, and a user interface, as will be further described herein (e.g., in connection with FIG. 6).

Host device 114 can be, for example, the computing device or mobile device of the host who is inviting the visitor to the meeting at the facility, as will be further described herein. For example, the host device 114 can be a laptop computer or desktop computer of the host. In such an example, the host device (e.g., computing device) 114 may be located at the facility, such as, for instance, in the host's office at the facility. As an additional example, the host device 114 can be a smart phone or tablet of the host. Further, host device 114 can include a memory, a processor, and a user interface, as will be further described herein (e.g., in connection with FIG. 6).

As shown in FIG. 1, visitor validation device 110 and computing device 112 can be located at an entry point 116 to the facility. The facility can be, for example, a commercial facility, such as an office building. However, embodiments of the present disclosure are not limited to a particular type of facility or building.

The entry point 116 to the facility can include an area, such as, for instance, a reception and/or security desk, station, and/or checkpoint, through which a visitor to the facility must pass. For example, computing device 112 can be the computing device of a receptionist and/or security personnel located (e.g., stationed) at the entry point 116 to the facility. Computing device 112 can be a laptop or desktop computer, for instance, and can include a memory, a processor, and a user interface, as will be further described herein (e.g., in connection with FIG. 6).

Visitor validation device 110 can be a device that controls (e.g., limits and/or restricts) access (e.g., entry) to the facility. For example, visitor validation device 110 can be and/or include a reader (e.g., card reader), beacon, and/or electronic lock. However, embodiments of the present disclosure are not limited to a particular type of visitor validation device. An individual, such as, for instance, a visitor to the facility, may gain access to (e.g., enter) the facility by providing (e.g., presenting) a valid identification mechanism, such as, for instance, a valid identification token, to visitor validation device 110, as will be further described herein.

Meeting registration and management computing device 106 can be a computing device located remotely from the facility. For instance, computing device 106 can be part of a centralized, cloud-based service (e.g., servers and/or databases) used for visitor meeting registration and management in accordance with the present disclosure. For example, computing device 106 can include and/or provide one or more portals for visitor meeting registration and management in accordance with the present disclosure. As used herein, a "portal" can include computer readable instructions that can be executed by a processing resource (e.g., processor) to perform a particular function. A portal can also include hardware, firmware, and/or logic that can perform a particular function. Further, computing device 106 can include a memory, a processor, and a user interface, as will be further described herein (e.g., in connection with FIG. 6).

As shown in FIG. 1, visitor mobile device 102, meeting registration and management computing device 106, computing device 112, and host device 114 can communicate with each other via network 108. Network 108 can be a wired or wireless network. For example, network 108 can be a network relationship through which mobile device 102, computing devices 106 and 112, and host device 114 can communicate with each other. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For instance, the network can include a number of servers that receive information from, and transmit information to, mobile device 102, computing devices 106 and 112, and host device 114 via a wired or wireless network.

As used herein, a "network" can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

In an example in which the host wishes to invite the visitor to a meeting at the facility, the host can, using host device 114, set up and send (e.g., transmit) an invitation for the meeting to meeting registration and management computing device 106 via network 108. Computing device 106 can then send, via network 108, the invitation for the meeting to visitor mobile device 102. That is, the visitor can receive, using mobile device 102 (e.g., mobile app 104), the invitation for the meeting from the host via meeting registration and management computing device 106 and network 108.

As an example, host device 114 and computing device 106 can set up and send the invitation for the meeting to visitor mobile device 102 via (e.g. through) email and/or a calendar application, such as, for instance, Outlook, O365, Google Calendar, etc. Further, mobile device 102 can receive the invitation via the calendar application. The invitation can include information (e.g., details) about the meeting, such as, for instance, who has invited the visitor to the meeting (e.g., the name of the host), and the date, time, and/or location of the meeting.

Meeting registration and management computing device 106 can also generate an invitation code associated with (e.g., for) the meeting, and send the invitation code to visitor mobile device 102. For example, computing device 106 can include the invitation code in the meeting invitation, or send the invitation code to visitor mobile device 102 separately from the invitation. The invitation code can be, for example, a combination of alpha and numeric characters. However, embodiments of the present disclosure are not limited to a particular type of invitation code.

Upon receiving the invitation for the meeting and the invitation code, mobile device 102 (e.g., mobile app 104) can display, on the user interface of mobile device 102, a welcome screen for the meeting to the visitor. The welcome screen can include an input field into which the visitor can input (e.g., enter and submit) the received invitation code. That is, mobile device 102 can receive the invitation code from the visitor via the welcome screen. An example of such a welcome screen will be further described herein (e.g., in connection with FIG. 2).

Upon receiving the invitation code from the visitor (e.g., upon the visitor inputting the invitation code into the input field in the welcome screen), mobile device 102 can display, on the user interface, a registration screen for the meeting. The registration screen can include an input field(s) into which the visitor can input registration information for the meeting. That is, mobile device 102 can receive the registration information for the meeting from the visitor via the registration screen. An example of such a registration screen will be further described herein (e.g., in connection with FIG. 3).

The registration information for the meeting can include personal information (e.g., personal details) of the visitor, such as, for instance, the name of the visitor and/or the entity the visitor works for (e.g., the company of the visitor). Further, the registration information for the meeting can include a photograph (e.g., photo) of the visitor. For instance, the visitor may upload a previously taken photograph, or may take a selfie using mobile device 102. Further, the registration information for the meeting can include a document(s) signed (e.g., electronically) by the visitor. The document(s) may include, for instance, agreement documents and/or safety documents the user may be required to read and/or complete before the meeting (e.g., before being permitted to enter the facility), and the visitor's signature may represent that the visitor has read and/or completed the required documents.

Upon receiving the registration information from the visitor, mobile device 102 can send, via network 108, the registration information to meeting registration and management computing device 106. That is, computing device 106 can receive the registration information from visitor mobile device 102 via network 108.

Upon receiving the registration information from visitor mobile device 102, meeting registration and management computing device 106 can generate an identification mechanism for the visitor, and send the identification mechanism to visitor mobile device 102. For instance, computing device 106 can email the identification mechanism to visitor mobile device 102. That is, visitor mobile device 102 can receive the identification mechanism for the visitor from computing device 106. Further, upon receiving the registration information, computing device 106 can send, via network 108, a notification to host computing device 114 that the visitor has registered for the meeting. This notification can be sent, for instance, as a push notification, SMS message, or email. Host computing device 114 can provide (e.g., display) this notification to the host (e.g., thereby providing an indication to the host that the visitor has completed the registration process).

The identification mechanism can be a mechanism for identifying the visitor that can be provided to visitor validation device 110. For example, the identification mechanism can be a quick response (QR) code. As an additional example, the identification mechanism can be a near-field communication (NFC) or Bluetooth (e.g. BLE) communication mechanism. However, embodiments of the present disclosure are not limited to a particular type of identification mechanism.

Upon receiving the identification mechanism from computing device 106, visitor mobile device 102 can display, on the user interface, a screen indicating the visitor has been registered for the meeting (e.g., thereby providing an indication to the visitor that he or she has completed the registration process). An example of such a screen will be further described herein (e.g., in connection with FIG. 4). As such, this registration process can be completed before the visitor arrives at the facility for the meeting, thereby reducing or eliminating delays upon arrival at the facility.

For example, upon arriving at the entry point 116 of the facility for the meeting, the visitor can provide the identification mechanism to visitor validation device 110 using mobile device 102. For instance, the user can present mobile device 102 to visitor validation device 102, in order to transfer the identification mechanism to visitor validation device 110. Upon receiving the identification mechanism from visitor mobile device 102, visitor validation device 110 can transfer the identification mechanism for the visitor to computing device 112.

Upon receiving the identification mechanism from visitor validation device 112, computing device 112 can provide (e.g., display), to the receptionist and/or security personnel located at the entry point 116, the registration information (e.g., personal information, photograph, and/or signed documents) for the meeting that was previously received from the visitor. For example, the receptionist and/or security personnel can use computing device 112 to send, via network 108, a request for the registration information to meeting registration and management computing device 106, which can send the registration information to computing device 112 responsive to receiving the request. The receptionist and/or security personnel can use the registration information to verify (e.g., visually verify) the identity of the visitor. For instance, the receptionist and/or security personnel can use the registration information to verify that the person providing the identification mechanism to visitor validation device 110 is in fact the visitor whose registration information corresponds to (e.g., matches) the identification mechanism.

Upon verifying the identity of the visitor, the receptionist and/or security personnel can use computing device 112 to send, via network 108, a notification to meeting registration and management computing device 106 that the visitor has provided the identification mechanism to visitor validation device 110 (e.g., a notification that the visitor has arrived at and is entering the facility). That is, computing device 106 can receive the notification from computing device 112 via network 108. The notification can also include a confirmation that the identification mechanism provided to visitor validation device 110 matches the identity of the visitor (e.g., a conformation that the receptionist and/or security personnel has verified the identity of the visitor).

Upon receiving the notification from computing device 112, meeting registration and management computing device 106 can send to visitor mobile device 102, via network 108, a digital badge for accessing the facility (e.g., for accessing the doors of the facility), and/or a map of the facility. That is, visitor mobile device 102 can receive the digital badge and/or the map from computing device 106 via network 108. The map can include, for instance, the location of the meeting within the facility, and navigational directions (e.g., the route) to the location of the meeting within the facility (e.g., starting from the entry point 116 of the facility). The digital badge can be used to access different locations in the facility. For instance, the visitor can provide (e.g., present) the digital badge to an access control device, such as access control device 118 illustrated in FIG. 1, located at the entrance to a particular location (e.g., area, room, zone, floor, etc.) in the facility in order to gain access to that location. The access (e.g. the level of access and/or access privileges) to the facility included in the digital badge may be pre-determined and/or provided by the host.

As an additional example, upon the visitor's arrival at entry point 116, visitor mobile device 102 can send, via network 108, personal identification information for the visitor, and location information indicating the visitor is located at entry point 116, to meeting registration and management computing device 106. The personal identification information for the visitor can be, for instance, a photograph (e.g., selfie) of the visitor, the social security number of the visitor, or biometric information of the visitor. The location information can include, for instance, an indication that the visitor (e.g., visitor mobile device 102) has passed through, and is inside of, a geofence located at entry point 116. Upon receiving the personal identification information and the location information from visitor mobile device 102, meeting registration and management computing device 106 can send, via network 108, the digital badge for accessing the facility, and/or the map of the facility, to visitor mobile device 102.

Further, upon receiving the notification from computing device 112, meeting registration and management computing device 106 can also send to host device 114, via network 108, a notification that the visitor has arrived for the meeting and is entering the facility. This notification can be sent, for instance, as a push notification, SMS message, or email. Host device 114 can provide (e.g., display) the notification to the host. An example of such a notification will be further described herein (e.g., in connection with FIG. 5).

In some embodiments, upon receiving the notification from computing device 112, meeting registration and management computing device 106 may send to computing device 112, via network 108, a request to verify additional information about the visitor, such as, for instance, the national identity and/or citizenship of the visitor. This request may be based on the needs of the facility, such as, for instance, security clearance requirements for the facility. In response to computing device 112 receiving such a request, the receptionist and/or security personnel may verify the additional information with the visitor, and then use computing device 112 to send a notification to computing device 106 that the additional information has been verified. In such an embodiment, computing device 106 may only send the digital badge for accessing the facility and/or the map of the facility to visitor mobile device 102 upon receiving the notification from computing device 112 that the additional information has been verified.

After the visitor mobile device 102 has received the digital badge and/or map, the receptionist and/or security personnel can permit the visitor to pass through the entry point 116 and enter the facility. The visitor can then proceed through the facility to the location of the meeting utilizing the digital badge and/or map (e.g., without having to rely on the host).

Upon the visitor entering the facility, meeting registration and management computing device 106 can track the location of visitor mobile device 102 in the facility. For instance, the location of visitor mobile device 102 can be tracked using NFC, Bluetooth, or ultrasonic communication. Computing device 106 can provide the tracked location of visitor mobile device 102 to computing device 112, so that the receptionist and/or security personnel knows where the visitor is in the facility in case of emergency, for example.

Further, in case of an emergency situation occurring, such as, for instance, a personal emergency related to the visitor, the visitor can provide an indication to mobile device 102 of the emergency situation. That is, mobile device 102 can receive an indication from the visitor of the emergency situation. For example, mobile device 102 can receive the indication of the emergency situation via an SOS button of mobile app 104. Upon receiving the indication of the emergency situation, visitor mobile device 102 can send, via network 108, a notification of the emergency situation to meeting registration and management computing device 106. Computing device 106 can then send, via network 108, the notification to computing device 112, so that the receptionist and/or security personnel is notified of the emergency situation.

As an additional example, mobile device 102 can communicate with meeting registration and management computing device 106 when the visitor accesses (e.g. passes through) a particular (e.g., specifically marked) location in the facility. For instance, upon the visitor accessing a particular location in the facility (e.g. by presenting the digital badge received by mobile device 102 to access control device 118), mobile device 102 can send, via network 108, a notification to computing device 106. The notification can include, for example, a photograph of the visitor. Computing device 106 can then send, via network 108, the notification to computing device 112, so that the receptionist and/or security personnel can see, in an unobtrusive way, who is accessing that location.

Upon the visitor's meeting with the host ending, the host can send, using host device 114, a notification to meeting registration and management computing device 106 that the meeting has ended. For example, the host can send the notification using a link included in the notification previously received by host device 114 that the visitor had arrived for the meeting, as will be further described herein (e.g., in connection with FIG. 5). Computing device 106 can then send, via network 108, the notification to computing device 112.

Further, upon the visitor exiting the facility (e.g. after the meeting has ended), mobile device 102 can send, via network 108, a notification to meeting registration and management computing device 106 that the visitor has exited the facility. Computing device 106 can send, via network 108, this notification to computing device 106 and/or host device 114. Upon the visitor exiting the facility, mobile device 102 can also delete the digital badge and map of the facility from the mobile.

As such, the visitor's check out process can be completed quickly. For instance, the visitor may not have to stop and check out with the receptionist and/or security personnel at entry point 116 when exiting the facility.

FIGS. 2-5 illustrate example screen shots of displays provided for visitor meeting registration and management in accordance with an embodiment of the present disclosure. For example, screen shot 220 illustrated in FIG. 2, screen shot 330 illustrated in FIG. 3, and screen shot 440 illustrated in FIG. 4 can be output by mobile app 104 of visitor mobile device 102 previously described in connection with FIG. 1, and displayed to the visitor on the user interface of mobile device 102. Further, screen shot 550 illustrated in FIG. 5 can be displayed to a meeting host on the user interface of host device 114 previously described in connection with FIG. 1.

Figure 2:
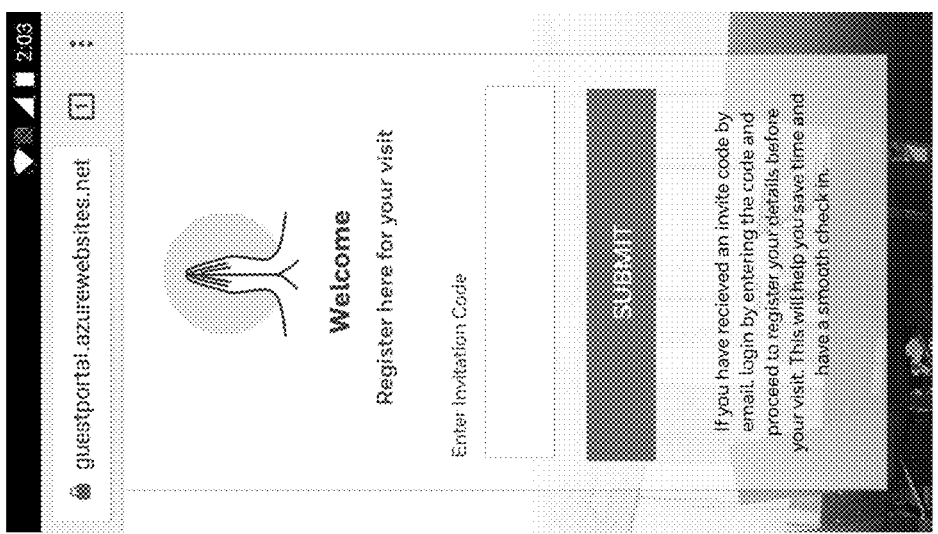

Screen shot 220 illustrated in FIG. 2 can be, for example, a welcome screen for a meeting to which the visitor has been invited by the host. As shown in FIG. 2, the welcome screen can include instructions to the visitor to enter an invitation code associated with (e.g. for) the meeting, and an input field into which the visitor can input (e.g., enter and submit) the invitation code. The invitation code can be, for instance, the invitation code previously described in connection with FIG. 1.

Figure 3:
FIGS. 2-5 illustrate example screen shots of displays provided for visitor meeting registration and management in accordance with an embodiment of the present disclosure.

Screen shot 330 illustrated in FIG. 3 can be, for example, a registration screen for the meeting, displayed in response to the visitor having input the invitation code into the welcome screen of FIG. 2. As shown in FIG. 3, the registration screen can include input fields into which the visitor can input registration information for the meeting.

As previously described herein (e.g., in connection with FIG. 1), the registration information can include personal details of the visitor, and a photo of the visitor. For instance, in the example illustrated in FIG. 3, the registration screen includes input fields into which the visitor can input his or her first name, last name, and the name of the company for which the visitor works. Further, upon the user inputting these personal details and selecting the NEXT button shown in FIG. 3, the registration screen may instruct (e.g., prompt) the visitor to input a photo of the visitor by, for instance, uploading a previously taken photograph or taking a selfie.

Figure 4:
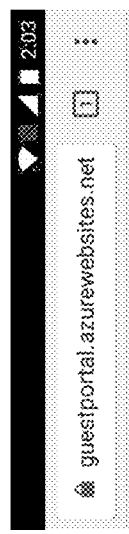
Figure 4:

Screen shot 440 illustrated in FIG. 4 can be, for example, a screen indicating the visitor has been successfully registered for the meeting. For example, as shown in FIG. 4, the screen can include an indication that the visitor has received an identification mechanism (e.g., a QR code) for identifying the visitor that can be provided to a visitor validation device (e.g., visitor validation device 110 previously described in connection with FIG. 1) when the visitor arrives at the facility, as previously described herein. Further, the screen can include the identification mechanism (e.g., QR code) itself, as illustrated in FIG. 4.

Figure 5:
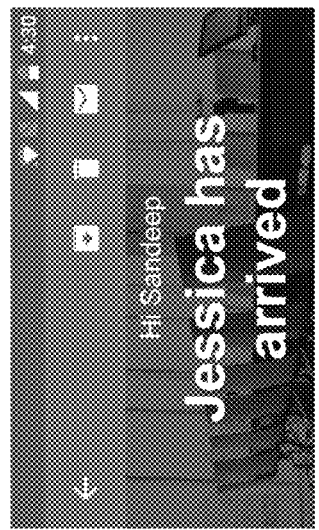

Screen shot 550 illustrated in FIG. 5 can be, for example, a notification to the meeting host that the visitor has arrived at the facility for the meeting. The notification can be provided to the host, for example, upon the visitor providing the identification mechanism to the visitor validation device at the entry to the facility, as previously described herein (e.g., in connection with FIG. 1). Further, as shown in FIG. 5, the notification can include a link (e.g., button) that the host can select when the meeting ends to send a notification that the meeting as ended, as previously described herein (e.g., in connection with FIG. 1).

Figure 6:
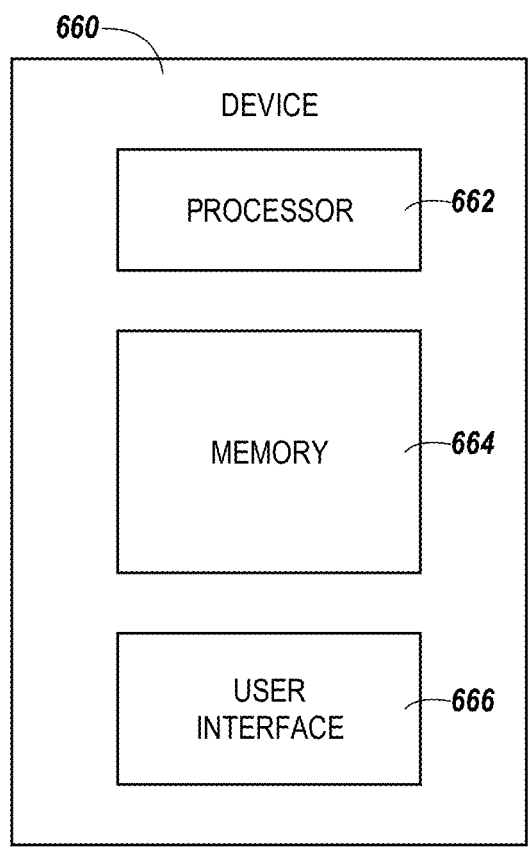
FIG. 6 illustrates an example of a device for visitor meeting registration and management in accordance with an embodiment of the present disclosure.

FIG. 6 illustrates an example of a device 660 for visitor meeting registration and management in accordance with an embodiment of the present disclosure. Device 660 can be an example of, for instance, visitor mobile device 102, meeting registration and management computing device 106, computing device 112, and/or host device 114 previously described in connection with FIG. 1.

As shown in FIG. 6, device 660 can include a processor 662 and a memory 664. Memory 664 can be any type of storage medium that can be accessed by processor 662 to perform various examples of the present disclosure. For example, memory 664 can be a non-transitory computer readable medium having computer readable instructions (e.g., computer program instructions) stored thereon that are executable by processor 664 to perform visitor meeting registration and management in accordance with the present disclosure. That is, processor 662 can execute the executable instructions stored in memory 664 to perform visitor meeting registration and management in accordance with the present disclosure.

Memory 664 can be volatile or nonvolatile memory. Memory 664 can also be removable (e.g., portable) memory, or non-removable (e.g., internal) memory. For example, memory 664 can be random access memory (RAM) (e.g., dynamic random access memory (DRAM), resistive random access memory (RRAM), and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 664 is illustrated as being located in device 660, embodiments of the present disclosure are not so limited. For example, memory 664 can also be located internal to another computing resource (e.g., enabling computer readable instructions to be downloaded over the Internet or another wired or wireless connection).

As shown in FIG. 6, computing device 660 can include a user interface 666. A user (e.g., operator) of device 660 can interact with device 660 via user interface 666. For example, user interface 666 can provide (e.g., display) information to and/or receive information from (e.g., input by) the user of device 660.

In some embodiments, user interface 666 can be a graphical user interface (GUI) that can include a display (e.g., a screen) that can provide and/or receive information to and/or from the user of device 660. The display can be, for instance, a touch-screen (e.g., the GUI can include touch-screen capabilities). As an additional example, user interface 666 can include a keyboard and/or mouse the user can use to input information into device 660, and/or a speaker that can play audio to the user. Embodiments of the present disclosure, however, are not limited to a particular type(s) of user interface.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A mobile device for visitor meeting registration and management, comprising:
   a user interface;
   a memory; and
   a processor configured to execute executable instructions stored in the memory to:
      receive, from a user of the mobile device via the user interface, an invitation code associated with an invitation received by the mobile device for a meeting at a facility;
      display, on the user interface upon receiving the invitation code, a registration screen for the meeting;
      receive, from the user via the registration screen displayed on the user interface, registration information for the meeting, wherein the registration information includes personal information of the user and a photograph of the user;
      send the registration information to a computing device associated with the facility;
      receive, from the computing device associated with the facility, an identification mechanism for the user, wherein the identification mechanism for the user includes a quick response (QR) code for identifying the user;
      provide the identification mechanism for the user to a visitor validation device at an entry point to the facility; and
      receive, from the computing device associated with the facility upon providing the identification mechanism to the visitor validation device, a digital badge for accessing the facility.

2. The mobile device of claim 1, wherein the processor is configured to execute the instruction to receive, upon providing the identification mechanism to the visitor validation device, a map of the facility.

3. The mobile device of claim 1, wherein the personal information of the user includes:
   the name of the user; and
   a company of the user.

4. The mobile device of claim 1, wherein the registration information for the meeting includes a document signed by the user.

5. The mobile device of claim 1, wherein the identification mechanism for the user includes a near-field communication (NFC) or Bluetooth communication mechanism.

6. A computing device for visitor meeting registration and management, comprising:
   a memory; and
   a processor configured to execute executable instructions stored in the memory to:
      send, to a mobile device of a first user:
         an invitation for a meeting at a facility from a second user; and
         an invitation code associated with the invitation;
      receive, from the mobile device, registration information for the meeting from the first user;
      send, to the mobile device upon receiving the registration information, an identification mechanism for the first user;
      receive, from a computing device at an entry point to the facility, a notification that the first user has provided the identification mechanism to a visitor validation device at the entry point; and
      send, upon receiving the notification:
         a digital badge for accessing the facility to the mobile device of the first user; and
         a notification to the second user that the first user has arrived at the facility.

7. The computing device of claim 6, wherein the processor is configured to execute the instructions to:
   receive, from the mobile device of the first user, personal identification information for the first user and location information indicating the first user is located at the entry point to the facility; and
   send the digital badge to the mobile device of the first user upon receiving the personal identification information and the location information.

8. The computing device of claim 6, wherein the processor is configured to execute the instructions to, upon receiving the notification that the first user has provided the identification mechanism to the visitor validation device:
   send, to the computing device at the entry point to the facility, a request to verify additional information about the first user; and
   send the digital badge to the mobile device of the first user upon receiving a notification from the computing device at the entry point to the facility that the additional information about the first user has been verified.

9. The computing device of claim 6, wherein the notification that the first user has provided the identification mechanism to the visitor validation device includes a confirmation that the identification mechanism provided to the visitor validation device matches the first user.

10. The computing device of claim 6, wherein the processor is configured to execute the instructions to, upon receiving the registration information for the meeting from the first user, send a notification to the second user that the first user has registered for the meeting.

11. The computing device of claim 6, wherein the processor is configured to execute the instructions to track the location of the mobile device of the first user upon the first user entering the facility.

12. The computing device of claim 6, wherein the processor is configured to execute the instructions to receive, from the second user, a notification that the meeting has ended.

13. A method for visitor meeting registration and management, comprising:
- receiving, by a mobile device, an invitation code associated with an invitation for a meeting at a facility;
- displaying, by the mobile device upon receiving the invitation code, a registration screen for the meeting;
- receiving, by the mobile device via the registration screen:
  - personal information of a user of the mobile device; and
  - a photograph of the user of the mobile device;
- sending, by the mobile device, the personal information and photograph of the user to a computing device associated with the facility;
- receiving, by the mobile device from the computing device associated with the facility, a quick response (QR) code for identifying the user;
- providing, by the mobile device, the QR code to a visitor validation device at an entry point to the facility; and
- receiving, by the mobile device upon providing the identification mechanism to the visitor validation device:
  - a digital badge for accessing the facility; and
  - a map of the facility.

14. The method of claim 13, wherein the map of the facility includes:
- the location of the meeting within the facility; and
- navigational directions to the location of the meeting within the facility.

15. The method of claim 13, wherein the method includes:
- receiving, by the mobile device from the user, an indication of an emergency situation occurring; and
- sending, by the mobile device to the computing device, a notification of the emergency situation.

16. The method of claim 13, wherein the method includes sending, by the mobile device, a notification to the computing device upon the mobile device accessing a particular location in the facility, wherein the notification includes the photograph of the user.

17. The method of claim 13, wherein the method includes sending, by the mobile device upon the user exiting the facility, a notification to the computing device that the user has exited the facility.

18. The method of claim 13, wherein the method includes deleting, by the mobile device, the digital badge and the map of the facility from the mobile device upon the user exiting the facility.

* * * * *